US011011135B2

(12) United States Patent
Pasca et al.

(10) Patent No.: US 11,011,135 B2
(45) Date of Patent: May 18, 2021

(54) HEAD-UP DISPLAY WITH TRANSPARENCY MASK

(71) Applicant: Continental Automotive GmbH, Hannover (DE)

(72) Inventors: Andrei Pasca, Timisoara (RO); Ferenc Markus, Timisoara (RO)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/141,498

(22) Filed: Sep. 25, 2018

(65) Prior Publication Data

US 2019/0096365 A1 Mar. 28, 2019

(30) Foreign Application Priority Data

Sep. 27, 2017 (EP) .................................. 17465553

(51) Int. Cl.
*G09G 5/10* (2006.01)
*G02B 27/01* (2006.01)

(52) U.S. Cl.
CPC ............... *G09G 5/10* (2013.01); *G02B 27/01* (2013.01); *G02B 27/0101* (2013.01); *G02B 2027/012* (2013.01); *G02B 2027/0118* (2013.01); *G02B 2027/0129* (2013.01); *G09G 2320/066* (2013.01); *G09G 2340/12* (2013.01); *G09G 2380/10* (2013.01)

(58) Field of Classification Search
CPC .................................. G09G 5/10; G02B 27/01
USPC ......................................................... 345/592
See application file for complete search history.

(56) References Cited

U.S. PATENT DOCUMENTS

| 5,812,100 | A | 9/1998 | Kuba |
| 5,892,598 | A * | 4/1999 | Asakawa ............... G02B 27/01 359/13 |
| 6,078,427 | A | 6/2000 | Fontaine et al. |
| 8,619,005 | B2 | 12/2013 | Cok et al. |
| 2007/0234220 | A1 * | 10/2007 | Khan .................... G06F 3/0481 715/745 |
| 2015/0102980 | A1 * | 4/2015 | Pasca ................. G02B 27/0101 345/7 |
| 2017/0258639 | A1 * | 9/2017 | Wu ........................... A61F 9/06 |

FOREIGN PATENT DOCUMENTS

| DE | 102007024076 A1 | 5/2008 |
| DE | 102008048778 A1 | 4/2010 |
| DE | 102012219316 A1 | 6/2014 |
| EP | 0602555 A2 | 6/1994 |
| EP | 2778744 A1 | 9/2014 |

(Continued)

OTHER PUBLICATIONS

Navdy: "How to use Navdy Map Mode", Youtube, Feb. 16, 2017, XP054978446, Retrieved from the Internet: URL:https://www.youtube.com/watch?v+Q3pRQkg1B1K [retrieved on Jun. 22, 2018] *the whole document*.

(Continued)

*Primary Examiner* — Hai Tao Sun

(57) ABSTRACT

A head-up display has an image generator, an optical system, a transmissive screen and a transparency mask. The transparency mask is arranged close to a display of the image generator. A mask pixel map is applied to the processed image to get a masked image.

19 Claims, 6 Drawing Sheets

(56) References Cited

FOREIGN PATENT DOCUMENTS

| JP | 2012058479 A | 3/2012 |
| WO | 2016189857 A1 | 12/2016 |
| WO | 2017098688 A1 | 6/2017 |
| WO | 2017122300 A1 | 7/2017 |
| WO | 2017130290 A1 | 8/2017 |

OTHER PUBLICATIONS

Deng-Ke Yang et al.: "Fundamentals of Liquid Crystal Devices, 2nd Edition", In: Fundamentals of Liquid Crystal Devices, 2nd Edition, Jan. 31, 2014, Wiley, XP055377896, ISBN: 978-1-118-75200-5, pp. 514-514 *p. 514; figure 15.1*.
Search Report dated Mar. 19, 2018 from corresponding European Patent Application No. 17465553.0.
Extended Search Report dated Jul. 9, 2018 from corresponding European Patent Application No. 17465551.0.
European Examination Report dated Feb. 16, 2021 for the counterpart European Application No. 17 465 7 553.0.

\* cited by examiner

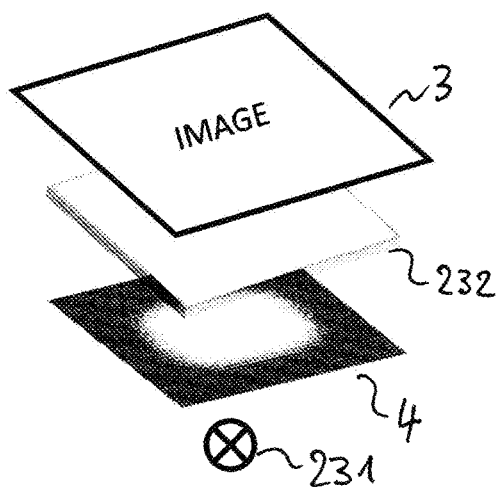
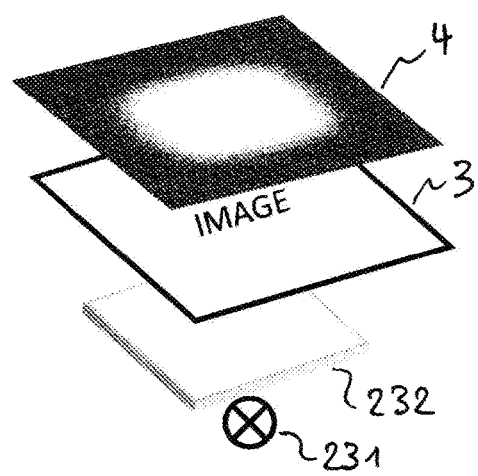
Fig. 13
Fig. 14
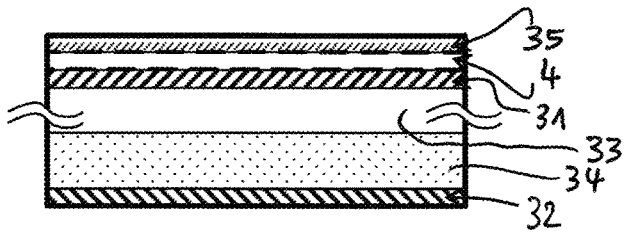
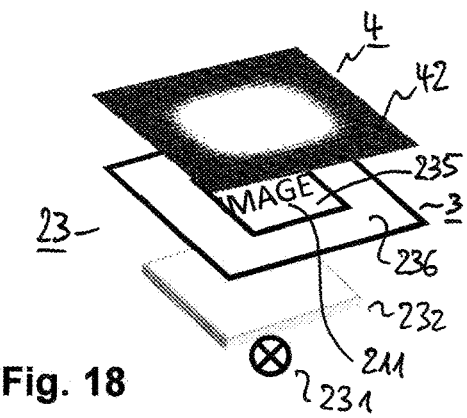
Fig. 15
Fig. 18
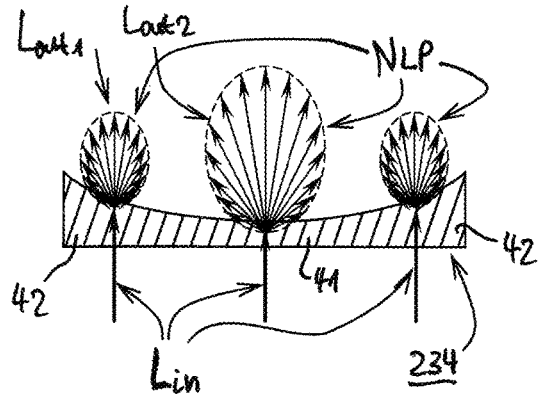
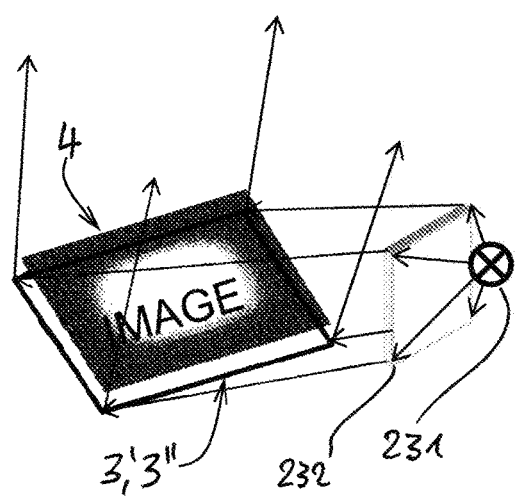
Fig. 16
Fig. 17

HEAD-UP DISPLAY WITH TRANSPARENCY MASK

TECHNICAL FIELD

The invention is directed to a head-up display that is provided with an image generator, an optical system, a transmissive screen, and a transparency mask, as well as to a method for driving such head-up display.

BACKGROUND

DE 10,2012/219316 A1 discloses such a head-up display with a transparency mask. The transparency mask has a transparency that is maximum in a middle area, is minimum in an outer area and continuously reduces from the inside to the outside of a transition area placed between middle area and outer area. This causes the symbols to be displayed to get darker towards the outer border of the display. A disadvantage of this publication is that it does not give advice about how to implement the transparency mask. An improved head-up display is desired.

SUMMARY

According to the invention the transparency mask is arranged close to a display of the image generator. This has the advantage of a reduced parallax effect.

According to the preferred variant of the invention, the head-up display is provided with a diffuser and the transparency mask is arranged between diffuser and the display. This has the advantage that the transparency mask can be added to an already existing design of the head-up display without the need to alter diffuser and/or image generator.

According to another preferred variant of the invention, the head-up display is provided with a diffuser and a light source, wherein the transparency mask is arranged between light source and diffuser. The advantage of this embodiment is that it allows the construction of the mask layer by a simple black halftone print on a transparent medium with a fairly low dot resolution, which is cost-effective. An acceptable disadvantage of this variant is a parallax effect due to the necessary distance between diffuser and display unit.

Another preferred variant of the invention is to arrange the transparency mask atop the display. This has the advantage of masking the light that actually exits the transmissive display in the area to be masked. Additionally, it has the advantage that the transparency mask can be added to an already existing head-up display device, e.g. as an aftermarket addition or as an easy upgrade of an existing product. However, if the transparency mask is arranged upstream the transmissive display, some undesired side effects might cause light not masked by the transparency mask to still be diverted into an area that should be masked. Such side effects are for example reflections between an upstream surface of the transmissive display and a downstream surface of the transparency mask or any other surfaces arranged in-between these.

According to preferred embodiments of the invention, the transparency mask is integrated into one or more of the display, the diffuser and the optical system, also commonly referred to as optical element. This has the advantage of less surfaces that are prone to cause undesired side effects.

Preferably the transparency mask is arranged as an outside layer of the display and/or the diffuser and/or the optical system. This has the advantage that production of such transparency mask is straightforward and allows more manufacturing flexibility. For example, it can be printed on an already designed display, diffuser, or optical system. Other preferred possibilities are gluing the transparency mask, adhesively bonding the transparency mask or painting the transparency mask on the display or a diffuser or the optical system.

Alternatively the transparency mask is arranged as an intermediate layer of the display and/or the diffuser and/or the optical system. This has the advantage that the transparency mask is protected against environmental influences as it is not an outside layer. In case of the display this has the advantage that the transparency mask is very close to the display layer of the image generator causing nearly no parallax effect.

According to a preferred variant of the invention the functionality of the transparency mask is integrated into the diffuser. The diffuser thus has a low opacity in a central area and increasing opacity in a peripheral area. This has the advantage of the functionality of transparency mask and diffuser being combined in a single element.

According to another preferred variant of the invention the head-up display comprises a postcard masking unit that applies a masking effect on image data used to drive the image generator. This has the advantage that no additional optical hardware element is required because the masking effect is reached electronically by image processing.

According to another variant of the invention the image generator has a display area surrounded by a display rim area, wherein the display area is provided for displaying information items and the display rim area is provided for not displaying information items. The transparency mask has a masking area being arranged thus that it geometrically corresponds to the display rim area. This has the advantage that the masking area in no case overlaps with an information item to be displayed. The driver is thus not irritated by masked or partly masked information items.

A method for driving a head-up display according to the invention comprises generating an image to be displayed, processing the generated image, applying a mask pixel map on the processed image to get a masked image, post-processing the masked image, and displaying the post-processed image. This has the advantages as described above.

BRIEF DESCRIPTION OF THE FIGURES

Further details, advantages and variants of the invention are provided in the following description of exemplary embodiments in the following figures. Wherein:

FIG. 13 depicts another arrangement of a transparency mask;

FIG. 14 depicts another arrangement of a transparency mask;

FIG. 15 depicts another arrangement of a transparency mask;

FIG. 16 depicts an anisotropic diffuser;

FIG. 17 depicts an HUD using a reflection display; and

FIG. 18 depicts another arrangement of a transparency mask.

DETAILED DESCRIPTION

Figure 1:
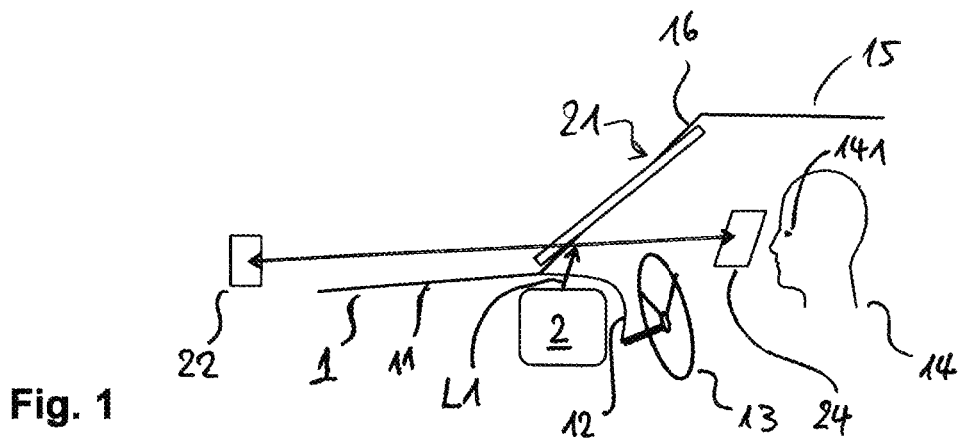
FIG. 1 depicts a vehicle using a head-up display.

FIG. 1 shows a vehicle 1 using a head-up display 2, in the following also referred to as HUD 2. On the left side an engine hood 11 is visible. The HUD 2 is arranged below a dashboard 12. Behind the steering wheel 13, the driver's head 14 is shown. Between rooftop 15 and engine hood 11, a windshield 16 is arranged. The windshield 16 acts as a transmissive screen 21 of the head-up display 2. The HUD 2 generates optical beams L1, which are reflected at the transmissive screen 21 and fall into the driver's eye 141 as long as the eye 141 is within an area called eyebox 24. As long as the eye 141 is within the eyebox 24, the driver sees a virtual image 22 that appears to be outside the vehicle 1 in front of the windshield 16.

Automotive head-up displays 2 are used to convey critical vehicle information directly in the field of view of the vehicle's conductor or driver. The information is delivered to the driver at a certain distance so that no or nearly no accommodation of the driver's eye 141 is required when the driver switches from viewing the road in front of him to reading the vehicle's status shown as the virtual image 22. This approach reduces the reaction time of the driver by several hundreds of milliseconds, thus increasing road safety. At a speed of 120 km/h a 300 ms delay translates in a covered distance of about 10 m, which is about 10% of the total stop distance of the vehicle 1. As seen in FIG. 1, the HUD 2 creates a virtual image 22 ahead of the transmissive screen 21. The transmissive screen 21 can be the windshield 16 of the vehicle 1, as shown, or a different, dedicated, partially reflective surface separated from the windshield. Such surface is a so-called combiner. The virtual image 22 is visible from a limited region of space only, the so-called eyebox 24.

It should be clear to a person skilled in the art that the depictions in the described figures are only simplifications done for ease of understanding. The real life systems may differ in construction details without departing from the invention described with help of the figures. From this, it is to be understood that the used descriptive words should not be considered only for their basic meaning but also for equivalents.

The same reference signs are used for the same elements shown in the following figures. They are not necessarily described again, except if they differ in function or if such description seems meaningful with regard to the respective embodiment.

Figure 2:
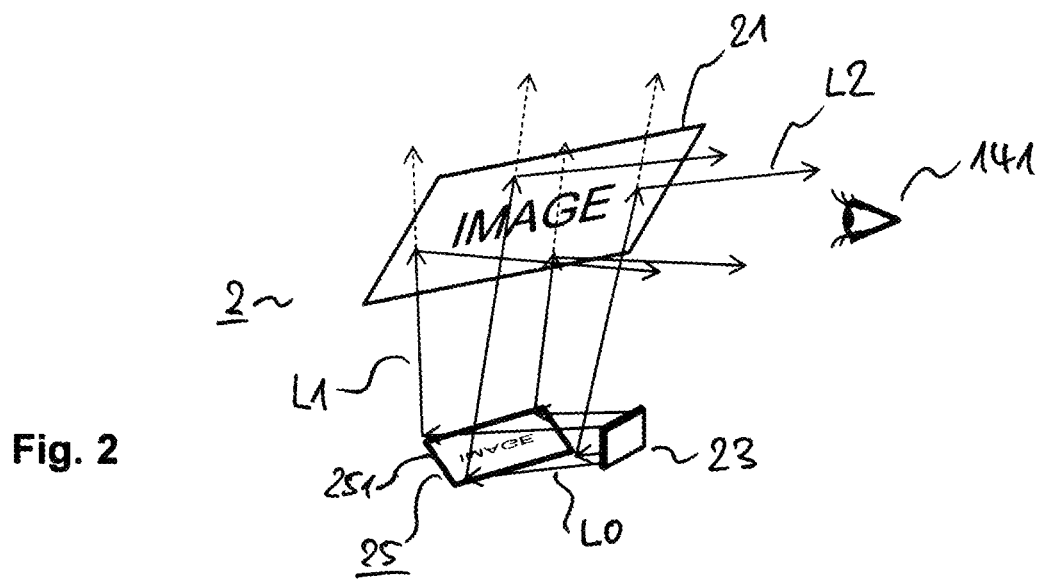
FIG. 2 depicts a head-up display.

FIG. 2 shows an HUD 2 having an image generator 23, also referred to as image projection system below, that generates an optical beam L0. The optical beam L0 enters a generic optical system 25, here illustrated by an optical mirror 251, from which an optical beam L1 is directed to the transmissive screen 21. A part of the light of beam L1 passes through the transmissive screen 21, which is indicated by dotted arrows. Another part is reflected by the transmissive screen 21 and thus reaches the driver's eye 141 as optical beam L2.

Figure 3:
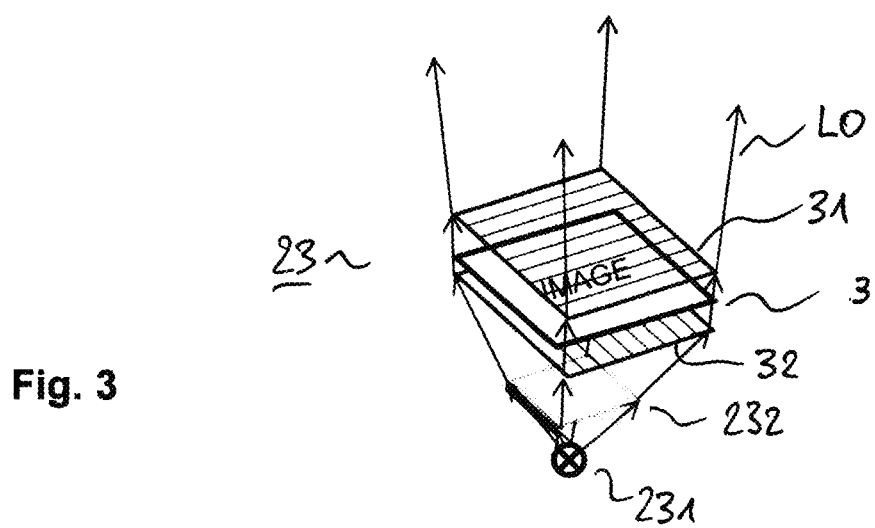
FIG. 3 depicts an image projection system.

FIG. 3 shows an image projection system as image generator 23 having a light source 231, a diffuser 232, and a display 3, for example a transmissive liquid crystal display (LCD). At the front side of the display 3 a front polariser 31 is arranged, at the backside a back polariser 32. The beam L0 leaves the image generator 23.

HUD systems as depicted in FIG. 2 and FIG. 3 usually consist of an image generator 23 coupled to an optical system 25 that directs the image formed by the image generator 23 onto a transparent screen, the transmissive screen 21. In the example shown, the image generator 23 is provided with a backlight unit, the light source 231, which for example uses LEDs, laser beams or is of any other type of light source. The image generator is further provided with an image forming system that may be a set of sweeping mirrors, micromirror arrays using MEMS technologies or, as shown in FIG. 3, an active matrix liquid crystal display constructed on a flat, rigid glass backplane. The essential parts of the image generator 23 for an LCD-based system as illustrated in FIG. 3 are, as backlighting source, the light source 231, together with the diffuser 232. The diffuser 232 may be a simple diffuser film or a mixed function film like a combination of a diffuser and a brightness enhancing film, the front and back polarising films 31, 32 and an LCD, the image forming display 3.

The light source 231 illuminates the entire useful area of the display 3 as, usually, there is no a priori knowledge of where the generated symbols will be shown on the display 3. Thus, the entire usable surface of the display 3 needs to have the same properties. The generic optical system 25 may consist of one or several lenses and/or planar or nonplanar mirrors. These have the purpose of conducting the optical information from the image generator 23 to the transmissive screen 21 and to transform the optical image in such a way as to create a virtual image 22 situated several metres in front of the driver's head 14. The transmissive screen 21 may consist of a dedicated transparent screen called combiner, placed in front of the driver's head 14, for example close to the vehicle's windshield 16 or glass canopy. For the sake of simplicity, the term transmissive screen 21 is used herein independent of the actual implementation of the HUD system. The purpose of the transmissive screen 21 is to alter the optical path in such a way that a part of the light generated by the image generator 23 and the generic optical system 25 is directed towards the head 14 of the driver.

Figure 4:
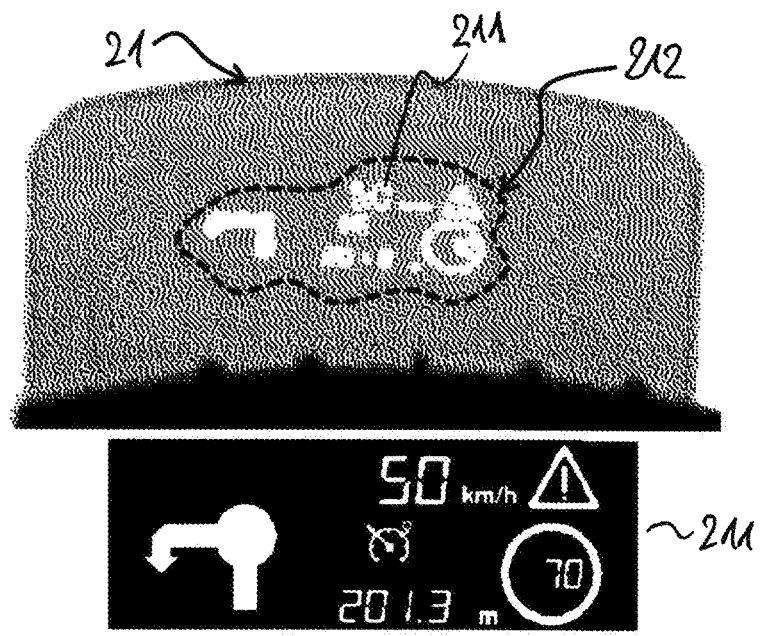
FIG. 4 depicts an ideal head-up display image.

FIG. 4 shows an ideal HUD image on a transmissive screen 21, here a so-called combiner. Below the transmissive screen 21 an arrangement of symbols 211 to be displayed is indicated. The symbols 211 use the symbol area 212 indicated by the dashed line on the transmissive screen 21. An important aspect of any HUD system is to generate the virtual image 22 without introducing any other visible artefacts. In the ideal case, the HUD system only produces the needed symbols 211, as shown in FIG. 4. In the ideal case, such view can be produced by displaying the required symbols 211 on a black background as seen in the lower part of FIG. 4.

Since the image generated by the HUD system is overlaid on the scene in front of the driver, the black portions of the display 3 will be fully transparent as no supplemental light is added to the scene. The symbol areas, since they act like light sources, will appear blended into the scene as the light generated by them adds to the rest of the scenery. In reality, the transmittance of the display 3 cannot be Zero so that the display background is not fully dark. This results in stray light produced by the inactive areas. This stray light will also add to the scenery in front of the driver, potentially generating an undesired or irritating visual impression. In order to minimise the impact of the stray light, the transmittance of the display 3 for the black regions should be very low.

Figure 5:
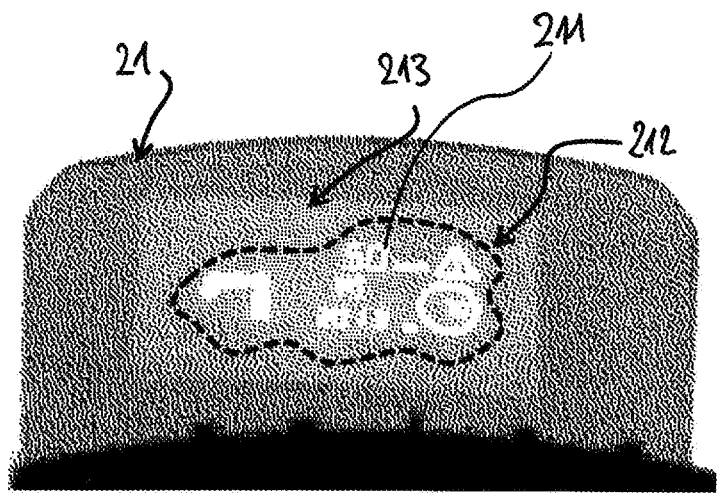
FIG. 5 depicts a real head-up display image.

FIG. 5 shows a real HUD image on a transmissive screen 21. Inside the symbol area 212 the symbols 211 to be displayed are visible in bright white or bright colour. Surrounding the symbol area 212 a so-called postcard area 213 is visible. This area 213 is illuminated by the display 3 that, in real cases, does not have the complete black background as shown in the lower part of FIG. 4, but has a slightly illuminated background.

For a typical system application the requirement of a low transmittance for the black regions translates in very high contrast ratios for the used display 3. Ideally, the contrast ratio should be larger than 5000:1. For LCD types, such high contrast ratio can be reached only with special construction techniques, that are usually not suited for mass produced systems. Another possibility to reach such very high contrast ratio is to use a special technique to generate the backlight of the image generation unit in such a way that the light intensity is modulated in correlation with the image content. This technique is also called local dimming. In this technique, local backlight areas can be dimmed if they are illuminating portions of the display that are not showing any information. This technique artificially increases the equivalent contrast ratio of the display 3. It is to be mentioned that there are also other possibilities to improve the HUD image perception, like modulating the transmittance of the transmissive screen 21 according to the ambient lighting conditions. This means: in bright light, the transmissive screen 21 is darkened while in low light conditions the transmissive screen 21 is more transparent. This allows a lower maximum brightness of the virtual image 22 to be seen in most practical situations. However, especially if the transmissive screen 21 is the windshield 16, the technique may not be applicable in the automotive industry where there are strict requirements for the minimum transmittance of the windshield 16.

Typical system applications are using displays 3 with contrast ratios typically larger than 800:1 to 1000:1 for the image generator 23. Given the desired maximum brightness of the symbols 211 shown by the HUD system, the contrast ratio limits the minimum brightness of the display background and, hence, makes it impossible to produce completely dark areas. Since the background of the HUD symbols 211 will not be a perfect black, the light coming from the background area still produces a visual impression for the driver, similar to that of FIG. 5. The effect is often called a "postcard effect" as the symbols 211 generated by the projection system appear as if they were part of a transparent postcard placed in front of the user of the HUD 2. Even with these very high contrast ratios there are situations, especially in lowlight conditions, where the HUD generated image still shows a postcard effect. Since the human eye is very good at discerning even small sharp contrast changes, so-called edges, an effect easily seen as "Mach bands" in luminance grating images, the boundary of the background postcard effect is easily discernible, decreasing the quality of the driver experience. Because of this effect, extensive resources are spent for improving the contrast ratio of display systems usually found in automotive HUD applications. This may include specially designed LCD displays incurring high per-unit costs for the display. This may also include special backlight techniques, like local backlight dimming which incurs high system complexity. It may also include using different niche display technologies like laser beam scanners or digital micro mirror arrays which have lower maturity levels for automotive applications than state-of-the-art LCDs, usually having a higher per-unit price, leading to higher overall system costs. As a side effect of the high system costs, the HUD systems are usually targeted at mid to high or premium class vehicles.

Figure 6:
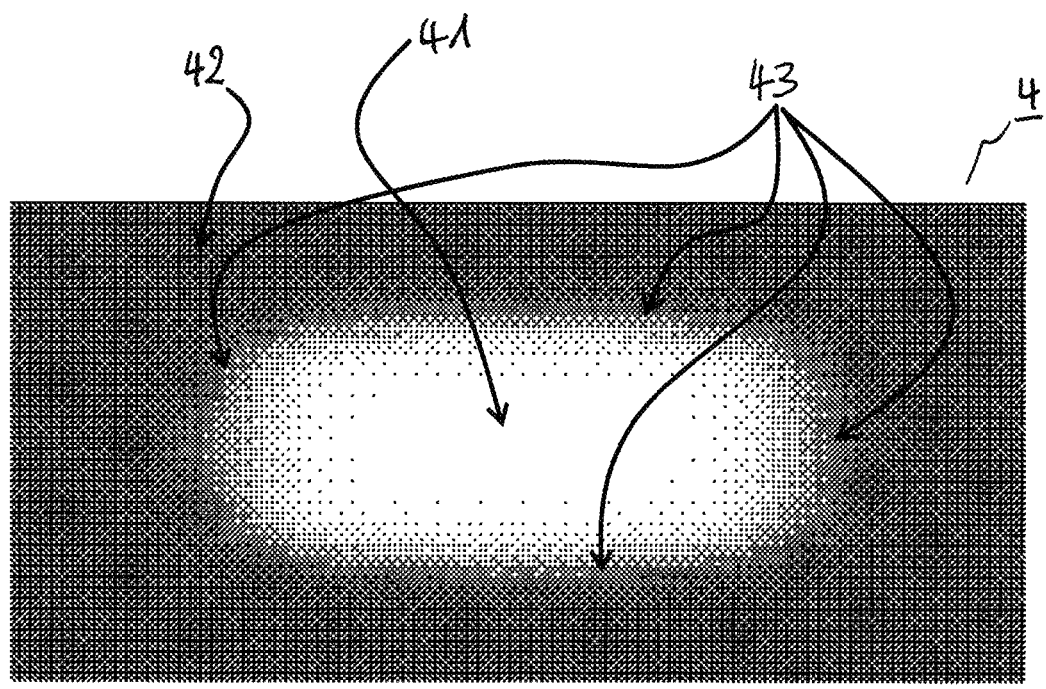
FIG. 6 depicts transparency mask.

FIG. 6 shows a transparency mask 4. It has a transparent area 41 in the centre and an opaque area 42 at the outside. Between these areas 41, 42 there is a soft transition area 43. Without requiring a very high contrast ratio display, the end-user perception is improved by softening the transition between the illuminated area and the periphery of the display 3. In this way, while the overall background brightness in the HUD system active area remains the same, because there is no longer a sharp contrast transition at the periphery of the illuminated area, the perception of the postcard effect is strongly attenuated for the end-user, here the driver. The softening of the transition is produced with the aid of the transparency mask 4 interposed between the light source 231 and the display 3 that, ideally, fully blocks the light at the periphery of the display 3 and then gradually passes more and more light towards the centre of the active area, ideally up to total transparency.

Figure 7:
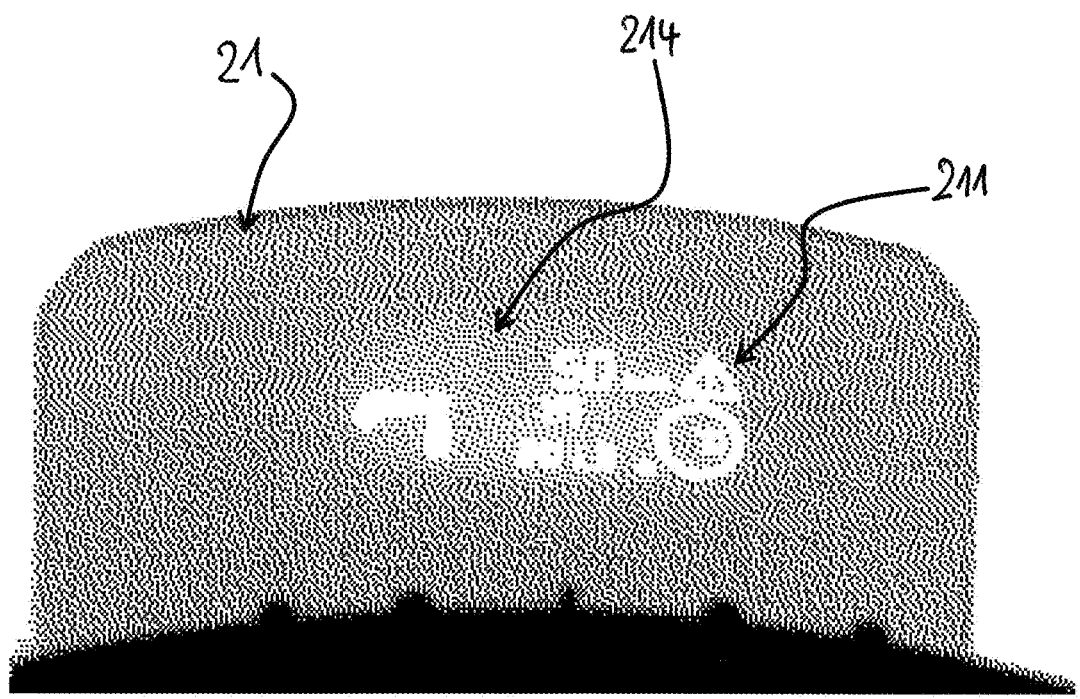
FIG. 7 depicts image generated using a transparency mask.

FIG. 7 shows an HUD image generated using the transparency mask 4. Similar to FIG. 5, the transmissive screen 21 displays symbols 211. No postcard area is visible, instead an attenuated outer rim area 214 is visible. Although in practical situations it is impossible to produce fully black or fully transparent regions, for the purpose of explaining the current invention, the rest of the description can use the terms black or opaque and respectively transparent as if they were ideal, without affecting the meaning or the conclusions that can be drawn from the current proposal. It should be mentioned that the present invention is working even if the black area is not completely dark and/or the transparent areas do not have 100% transmittance. In fact, there will be a net improvement in the user perception even if the contrast ratio, defined as the ratio between the transmittance of the transparent areas and that of the opaque areas, is as low as 3:1-5:1. Of course, preferably, the contrast ratio should be at least 10:1 or even higher and the transmittance of the transparent area 41 should be as close as possible to 100% in order to reduce the penalty in the required system power. For instance, in order to maintain the same symbol brightness, if the transparent area 41 has only 50% transmittance, the backlight output power should be doubled to compensate for the losses induced by the transparency mask 4. Applying the transparency mask 4 to the backlight system yields an image similar with that of FIG. 7, where the edges of the postcard area are highly attenuated and only the inner part of the outer rim 214 is visible.

Figure 8:
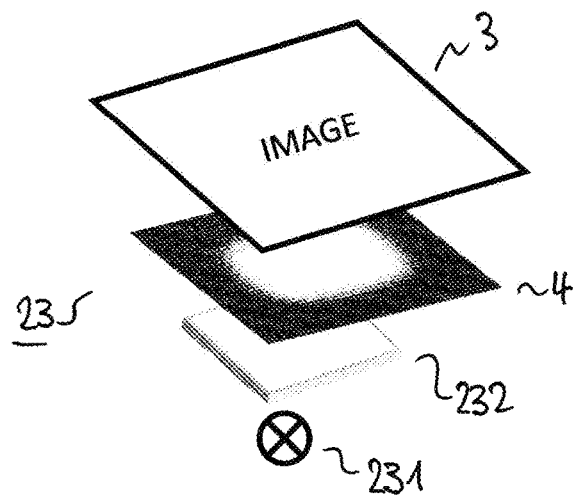
FIG. 8 depicts arrangement of a transparency mask.

FIG. 8 shows a first arrangement of a transparency mask 4 in an HUD image generator 23. The transparency mask 4 is arranged between the diffuser 232 and the display 3. That is, the display 3 is arranged downstream the transparency mask 4. Here and in many of the following drawings a transmissive display 3 is depictured, although also other types of displays may also be applied with the inventive solution.

The position of the transparency mask 4 inside the system construction is not critical as long as it is placed between the light source 231 and the display 3. That is, the transparency mask 4 may be placed directly above the light source 231, at a certain distance from the back surface of the display 3, or it can be constructed as new layer directly bonded to the glass layer of the display 3. Even more, in specific instances, it may be placed in front of the display 3, directly in the optical path.

Usually, since the projection distance of the virtual image 22 created by the HUD system is larger than the distance between the display 3 and the transmissive screen 21 which acts as mirror, the optical path between the display 3 and the transmissive screen 21 must provide a specific magnification factor. However, this magnification factor affects also the apparent distance between the display 3 and the light source 231 as perceived in the virtual image. That is, since the light source 231 usually is not directly bonded to the display 3 but sits at a certain distance behind the backside of the display device, here behind the diffuser 232, the driver will perceive this as if the light source 231 sits at a magnified distance behind the virtual image projected by the HUD system. This may create a parallax effect when the driver changes position in the system's eye box 24. For state of the art implementations of HUD systems this translates in a shift of the displayed symbols 211 inside the postcard. For the present invention, if the transparency mask 4 is applied directly to the light source 231, while the edges of the postcard are highly attenuated, the parallax effect may still degrade the user experience. From this, the preferred embodiment of the present invention has the transparency mask 4 placed as close as possible to the display 3, minimizing the apparent distance between the shown symbols 211 and the transparency mask 4. The projection distance is the distance between the windshield 16 and the virtual image 22.

Figure 9:
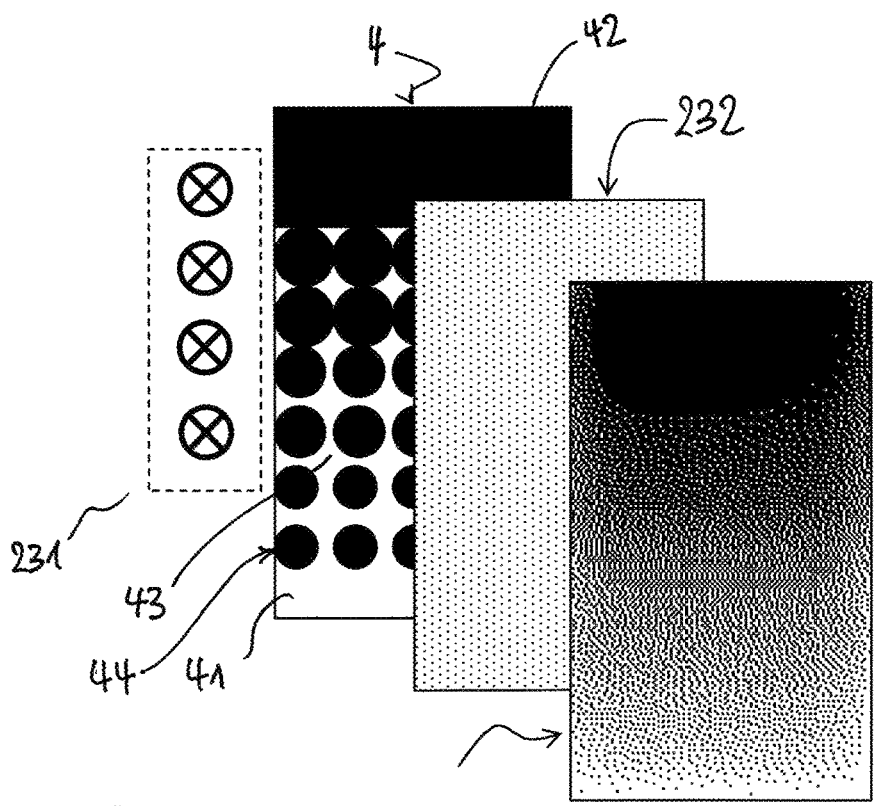
FIG. 9 depicts another arrangement of a transparency mask.

FIG. 9 shows another preferred arrangement of a transparency mask 4. On the left side in the back a light source 231 is depicted. Then follows the transparency mask 4, followed by the diffuser 232. This means that the transparency mask 4 is placed between the light source 231 and the diffuser 232. Both are placed as close as possible to the display 3, that is close enough to minimize the parallax effect but far enough to blur the dots of the halftone print 44. In the front on the right side the effect of this assembly of transparency mask 4 and diffuser 232 is shown. The advantage of this embodiment is that it allows the construction of the transparency mask 4 by a simple black halftone print 44 on a transparent medium, with a fairly low dot resolution, which is a cost effective solution. Because the diffuser 232 acts as an image blurring device, the light that passes the assembly of transparency mask 4 and diffuser 232 exhibits a soft and continuous transition between the opaque area 42 and the transparent area 41.

Figure 10:
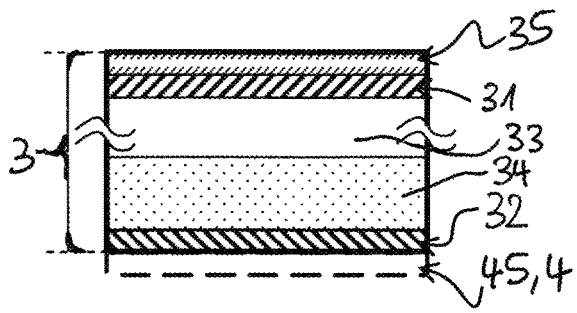
FIG. 10 depicts another arrangement of a transparency mask.

FIG. 10 shows another arrangement of a transparency mask 4 in sectional view. The transparency mask 4 is directly built as part of the display stack-up, as a surface coating 45 layer placed on the backside of the display 3. It should be clear to everyone skilled in the art that it is not necessary for the transparency mask 4 to be constructed as a separate, physical, element. In fact, the transparency mask 4 is, according to the variant shown in FIG. 10, constructed as a surface coating 45 for the display 3. It may also be implemented as a painted layer over the diffuser 232 or by altering the opacity of the diffuser 232 or of any of the other possible layers forming the optical stack. In FIG. 10, the display 3 has a front polarizer 31, a back polarizer 32, a liquid crystal layer 33, a glass layer 34 and a coating layer 35 on one side and the transparency mask as surface coating 45 on the other side.

In certain circumstances, the postcard effect may arise due to image processing, even if the display unit is of sufficient quality. In these situations, even if the used display unit has a very high contrast ratio which would not produce a noticeable postcard effect in standard operating conditions, because the black level is altered, the end user will still perceive the effect of the image processing as a standard postcard. It is, however, possible to add the transparency mask effect as an additional image processing step performed by the HUD system image source.

Figure 11:
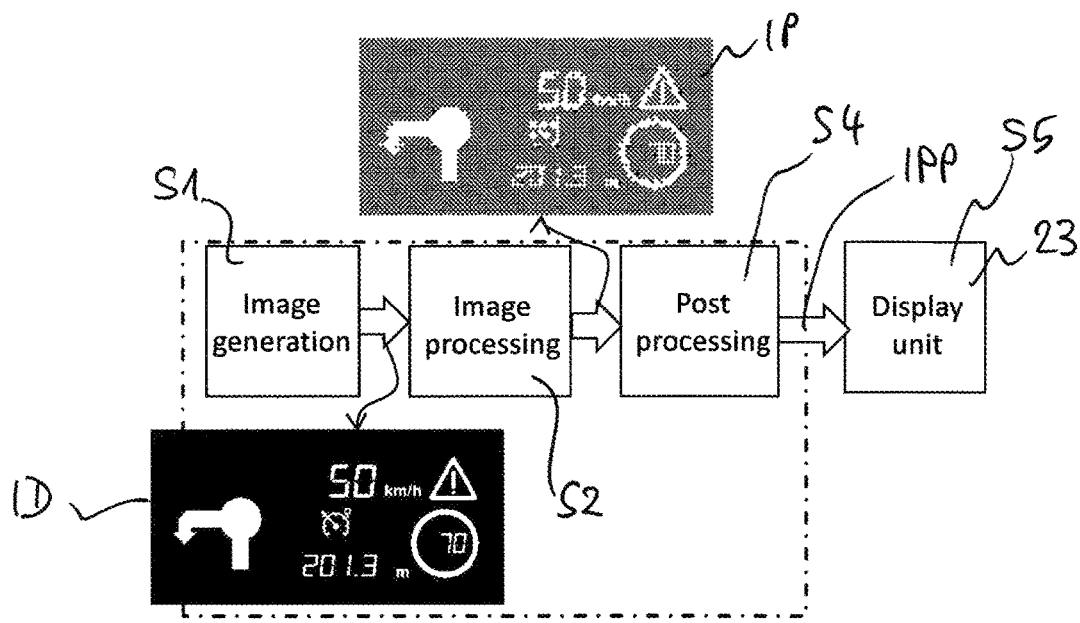
FIG. 11 depicts a method for generating a head-up display image.

FIG. 11 shows a method for generating an image to be displayed by an HUD. It comprises generating S1 an image ID to be displayed. Image processing S2 is applied to get a processed image IP. This image processing may artificially induce a postcard effect by altering the level of the display background. Post-processing S4 is applied to get a post-processed image IPP which is supplied S5 to a display unit, for example the image generator 23.

Figure 12:
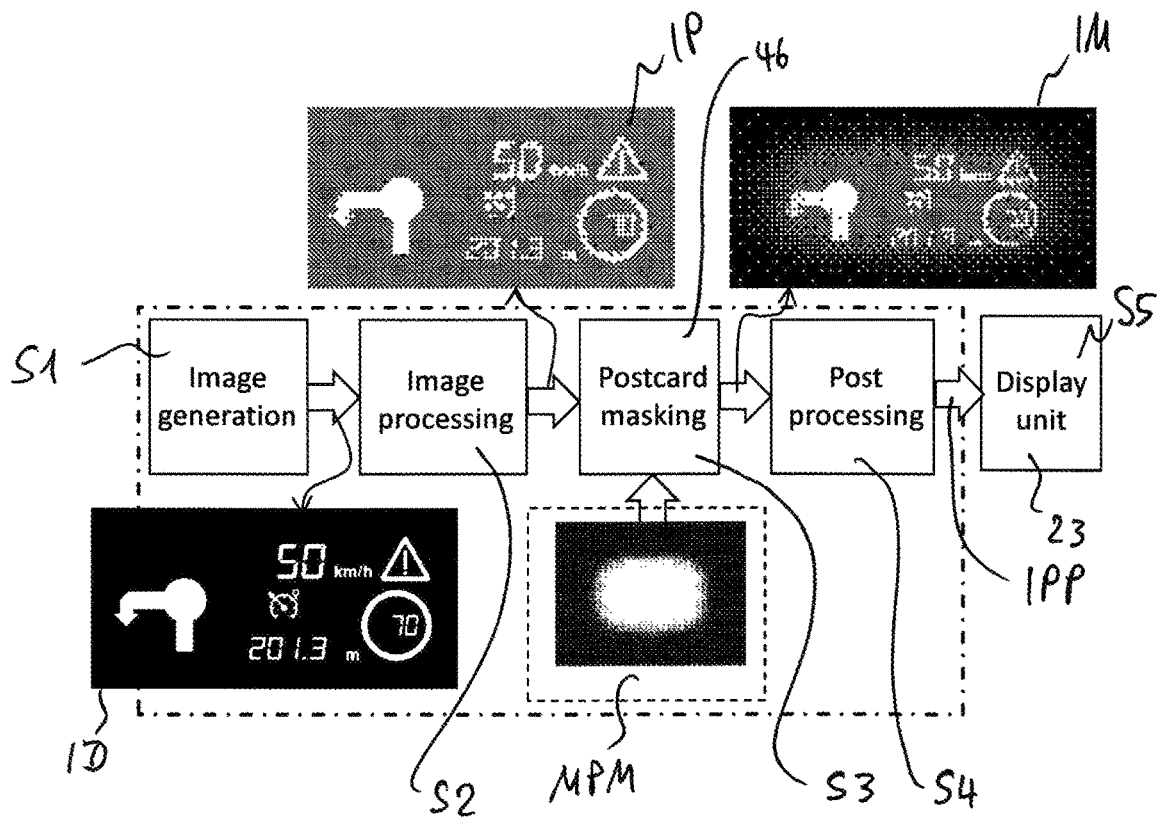
FIG. 12 depicts another method for generating a masked image.

FIG. 12 shows a method for generating a masked image IM. In addition to the steps described with respect to the previous figure, it comprises applying S3 a mask pixel map MPM on the processed image IP before performing post-processing S4.

For these situations, the masking is applied S3 directly on the image data as additional image processing in a postcard masking unit 46. This is shown in FIG. 12 where a mask pixel map MPM is applied S3 to get a masked image IM. The application of the masking is performed in the final stages of the processing chain, directly before sending the image IM to the image generator 23 or before some additional post-processing S4, like temporal dithering or any other processing that does not alter the overall image aspect or shape.

FIG. 13 shows another arrangement of a transparency mask 4 placed below the diffuser 232. Although it is not placed very close to the display 3, using halftone printing as shown with regard to FIG. 9 still produces the desired effect.

FIG. 14 shows another arrangement of a transparency mask 4. Here the transparency mask 4 is placed in front of the display 3 as a separate element. The diffuser 232 is placed between light source 231 and display 3.

FIG. 15 shows another arrangement of a transparency mask 4 in sectional view. Here, it is built as part of the display stack-up placed on the front side of the display 3 between front polarizer 31 and coating layer 35. Liquid crystal layer 33, glass layer 34 and back polarizer 32 are arranged as shown before.

FIG. 16 shows an example of an anisotropic diffuser 234. It has a non-constant thickness that increases towards its outside. The thickness is low in a central transparent area 41 and high in peripheral opaque areas 42. The intensity of incoming light $L_{in}$ is reduced depending on the thickness of the anisotropic diffuser 234 so that the intensity of outgoing light $L_{out1}$, $L_{out2}$ is correlated to the thickness of the anisotropic diffuser 234. Typically, the angle distribution of the outgoing light $L_{out1}$, $L_{out2}$ has a non-Lambertian pattern NLP.

There are multiple possibilities to create a diffuser 234 with altered opacity. One of the easiest ways is to have a diffuser 234 with a properly shaped variable thickness as shown. This comes from the dependence of the absorbed light on the distance travelled inside a given medium. The longer the path, the stronger the absorption, and hence, the lower the transmittance. FIG. 16 illustrates this effect in a suggestive manner. As a note, the diffuser 234 is anisotropic because its transmittance depends on the location of the diffuser surface and not because of the distribution of the light output. The shape of the light output distribution is independent of the actual position on the surface of the diffuser 234, the only difference being in its magnitude. The figure illustrates a non-Lambertian distribution because such a distribution is desirable for a HUD system as an important fraction of the light output is directed in a small angle towards the eyebox 24. Light that is distributed in a wider angle will not be visible from the driver's position so it is basically wasted light.

FIG. 17 shows an HUD using a reflection display 3'. Light generated by the light source 231 passes through the diffuser 232 and arrives through the transparency mask 4 on the reflective display 3'. From there it is reflected and passes again through the transparency mask 4. As the transparency mask 4 is passed twice the attenuation effect is increased. If, in a further variant, the display is a self-illuminated display 3", then the separate light source 231 and diffuser 232 are not needed.

Another possibility, not shown here in detail, is to use a DMD display where the transparency mask 4 can be placed in several places. One possible place is, again, close to the actual reflective DMD display as illustrated in FIG. 17. Another possibility is to have it close to an internal image screen of such DMD display. Such internal image screen effectively acts as a transmissive display so basically the same description/similar drawings as already described above apply here, too. Thus there are no separate drawings shown for these variants. Also transflective displays, which are a combination of transmissive and reflective type systems, can also be used with the inventive concept.

FIG. 18 shows the image generator 23 of a further variant of an inventive head-up display. Light generated by a light source 231 passes a diffuser 232 followed by a display 3 before passing the transparency mask 4. The display 3 of the image generator 23 has a display area 235 being provided for displaying information items 211. It has further a display rim area 236 being provided for not displaying information items 211. The transparency mask 4 has a masking area 42. The masking area 42 is located thus that its position corresponds to that of the display rim area 236. The masking area may have the same inner shape as the display rim area 236. Additionally, it should be clear to everyone skilled in the art that the shape of the transparent area 41 of the transparency mask 4 can have also other outlines than those shown here, correlated both to the symbols 211 that are to be shown by the HUD system and with some design styling in accordance to the style of the vehicle. The display rim area has a rectangular type shape due to the arrangement of rectangular pixels that form lines and rows of the display 4, while for the transparency mask there usually is higher freedom of design.

By having the transparency mask 4, the driver's perception is improved at a fraction of the costs required for the state of the art solutions used in premium class vehicles. Furthermore, the addition of the transparency mask 4 allows the usage of lower contrast ratio displays 3,3',3" than those of the current state of the art, further reducing the system costs. Even more, the usage of a transparency mask 4 allows the introduction of HUD systems also in lower cost cars or cars with high sales volumes, making the HUD system no longer a niche product.

The described embodiments may be altered and amended by a skilled person without departing from the invention. Although not described, also derivatives of the described embodiments or combination of different embodiments described above lie within the scope of the invention.

The invention claimed is:

1. A head-up display comprising:
an optical system having a light source, at least one lens, and at least one mirror;
an image generator coupled to the optical system;
a transmissive screen coupled to the image generator; and
a display;
a transparency mask, wherein the transparency mask is a transparent medium having a non-transparent pattern of half-tone shapes applied thereto to provide varying opacity, wherein the transparency mask has a transparent area in the centre and an opaque area at the outside, and between these a soft transition area, the transparency mask located between the light source and the display and being arranged close to the display.

2. The head-up display of claim 1 further comprising:
a diffuser;
wherein the transparency mask is located between the diffuser and display.

3. The head-up display of claim 2,
wherein the transparency mask is located between the light source and the diffuser.

4. The head-up display of claim 1, wherein the transparency mask is integrated into an optical element, said optical element being one of the diffuser and the optical system.

5. The head-up display of claim 4, wherein the transparency mask is an outside layer of said optical element.

6. The head-up display of claim 5, wherein the transparency mask is an intermediate layer of said optical element.

7. The head-up display of claim 6, wherein the optical element is a diffuser having low opacity in a central area and increasing opacity in a peripheral area.

8. A head-up display comprising:
an optical system having a light source, at least one lens, and at least one mirror;
an image generator coupled to the optical system;
a transmissive screen coupled to the image generator;
a display; and
a transparency mask, located between the light source and the display wherein the transparency mask is a transparent medium having a non-transparent pattern of half-tone shapes applied thereto to provide varying opacity, the transparency mask being arranged close to the display, wherein the transparency mask has a low opacity in a central area and increasing opacity in a peripheral area.

9. The head-up display of claim 8 further comprising:
a diffuser;
wherein the transparency mask is located between the diffuser and display.

10. The head-up display of claim 9,
wherein the transparency mask is located between the light source and the diffuser.

11. The head-up display of claim 9, wherein the transparency mask is integrated into an optical element, said optical element being one of the display, the diffuser and the optical system.

12. The head-up display of claim 11, wherein the transparency mask is an outside layer of said optical element.

13. The head-up display of claim 11, wherein the transparency mask is an intermediate layer of said optical element.

14. The head-up display of claim 8, further comprising a postcard masking unit that applies a masking effect on an image.

15. The head-up display of claim 8, wherein the transparency mask applies a postcard masking effect on an image.

16. The head-up display of claim 4, wherein the transparency mask is a surface coating applied to the optical element.

17. The head-up display of claim 16, wherein the transparency mask is a painted layer.

18. The head-up display of claim 9, wherein the transparency mask is a surface coating applied to one of an element of the optical system, the diffuser; and the display.

19. The head-up display of claim 18, wherein the transparency mask is a painted layer.

\* \* \* \* \*